Feb. 13, 1923.

R. J. KLEINECK

TIRE CHAIN HOOK AND TIGHTENER

Filed Feb. 24, 1922

1,445,598

WITNESSES

INVENTOR
R. J. Kleineck
BY
ATTORNEYS

Patented Feb. 13, 1923.

1,445,598

UNITED STATES PATENT OFFICE.

ROY J. KLEINECK, OF OXFORD JUNCTION, IOWA.

TIRE-CHAIN HOOK AND TIGHTENER.

Application filed February 24, 1922. Serial No. 538,847.

*To all whom it may concern:*

Be it known that I, ROY J. KLEINECK, a citizen of the United States, and a resident of Oxford Junction, in the county of Jones and State of Iowa, have invented a new and Improved Tire-Chain Hook and Tightener, of which the following is a description.

My invention relates to a device for tightening tire chains and other chains and the invention has for its general object to provide a device for the indicated purpose improved in various particulars whereby effective leverage can be exerted for drawing the chain tightly and whereby the parts will be automatically latched after the tightening movement.

Means by which the above and other objects are attained will clearly appear as the description proceeds.

Reference is to be had to the accompanying drawings forming a part of this specification, it being understood that the drawings are merely illustrative of one example of the invention.

Figure 1:
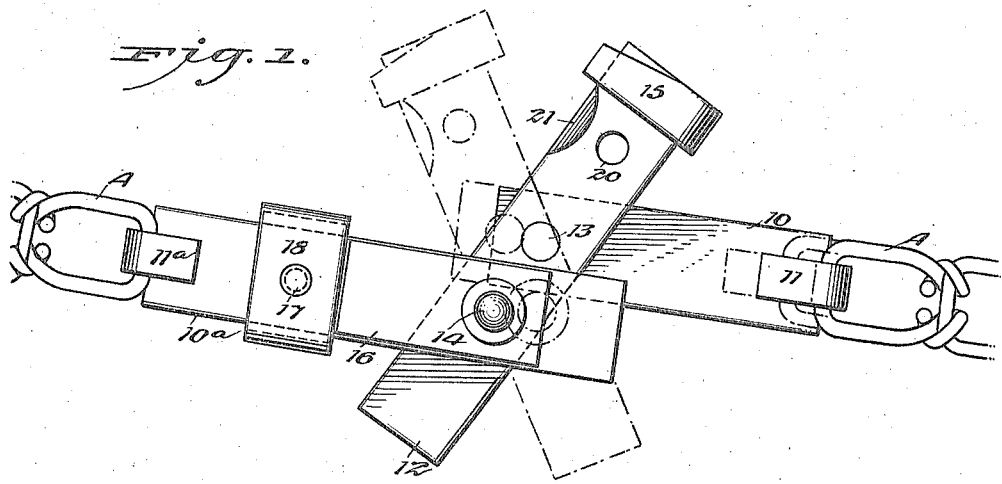
Figure 1 is a plan view of a chain tightener embodying my invention interposed in a chain to be tightened, the parts of the tightener being indicated in the positions they occupy before the tightening movements.

In carrying out my invention in accordance with the illustrated example two end elements 10, 10ª are provided having at their respective outer ends returned hooks 11, 11ª adapted to be engaged in two links A of the chain for tightening the latter. A lever 12 is pivoted by separate pivots 13, 14 to the respective end elements 10, 10ª at points distant from the ends of said lever.

On the lever 12 at one end is a transversely disposed hook 15 integral with the lever at one side edge and extending across the lever to the opposite side, said hook affording clearance so that the lever at the hook 15 may be caused to embrace one end element, 10ª, adjacent to the hook 11ª thereof. The hook 15 serves to give engagement between the end element 10ª and the lever 12 and is also utilized in swinging the lever outward from one position to the other as will appear.

A spring latch 16 preferably in the form of plate springs is provided on one face of one element 10ª and is suitably held in position preferably by means of that rivet 14ª pivoting the element 10ª to the lever 12. The hook 16 has a pin 17 projecting from the under side of a transverse finger plate 18 rigid with the spring of the latch. Said pin 17 is adapted to enter a hole 19 in that end element 10ª to which the latch is secured and to pass into a transverse hole 20 in the lever 12 which will register with the hole 19 when the element 10ª and lever 12 are swung to positions overlying each other. At a side edge said lever 12 is formed with a bevelled portion 21 which acts to raise the pin 17 as the lever is swung inwardly beneath the element 10ª carrying the pin, whereby the pin will be automatically engaged in the pin hole 20 of the lever.

Figure 2:
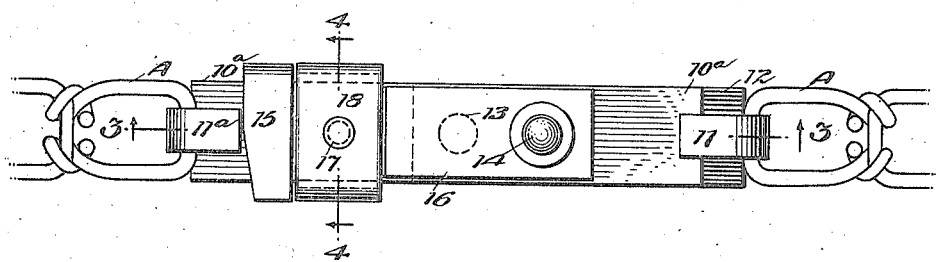
Figure 2 is a plan view of the parts latched after the tightening movements.
Figure 3:
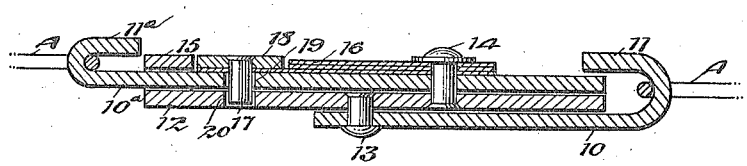
Figure 3 is a longitudinal section as indicated by the line 3—3, Figure 2.
Figure 4:
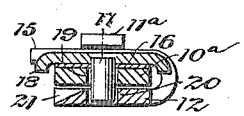
Figure 4 is a transverse section on the line 4—4, Figure 2.

With the described device the hooks 11, 11ª are engaged in two end links A of the chain or two distant links of the chain from which the slack is to be taken out, the lever 12 being disposed in a position separating the elements 10, 10ª. With the hooks 11, 11ª engaged in the chain links A the lever 12 is swung to a position to draw the elements 10, 10ª toward each other. Both said elements and the lever are super-imposed one on another as in Figures 2 to 4. As the parts approach the super-imposed position the pin 17 will ride up on the lever 12 at the inclined portion 21 and finally will spring into the hole 20 holding the parts latched.

I would state in conclusion that while the illustrated example constitutes a practical embodiment of my invention, I do not limit myself strictly to the exact details herein illustrated, since, manifestly, the same can be considerably varied without departure from the spirit of the invention as defined in the appended claims.

Having thus described my invention, I claim:

1. A tightener adapted to be interposed in a chain and comprising elongated end elements having oppositely disposed hooks at their outer terminals adapted to detachably engage respectively in links of the chain, a lever pivoted distant from its ends at separated points to said elements, said lever having a laterally disposed hook rigid with the lever at one side edge and extending across the lever to the opposite side edge, said hook adapted to engage one of said elements when the lever and the elements are swung to a position one on another, and a spring latch on one of said end elements, said latch having a transverse finger plate, and a latch pin projected from the under side of said plate, that end element carrying said latch, and the said lever, having holes adapted to register to receive said pin, said lever at a side edge thereof having a bevelled portion to engage and lift the pin when the lever is swung beneath the pin-carrying element.

2. A chain tightener adapted to be introduced into a chain, comprising end elements each having means to detachably engage respectively in links of the chain to be tightened, a lever pivoted at separated points to said elements, said lever presenting an opening and a beveled portion adjacent one end thereof, and a spring latch carried by one of said elements and adapted to be displaced by said beveled portion and engaged in said opening of the lever when said lever is moved to tighten said elements.

ROY J. KLEINECK.